(12) United States Patent
Samson, Jr.

(10) Patent No.: US 7,979,484 B2
(45) Date of Patent: Jul. 12, 2011

(54) METHOD AND SYSTEM FOR ACCELERATING THE COMPUTATION OF ADAPTIVE WEIGHTS USING MATRIX INVERSE CALCULATIONS

(75) Inventor: John R. Samson, Jr., Palm Harbor, FL (US)

(73) Assignee: Honeywell International Inc., Morristown, NJ (US)

( * ) Notice: Subject to any disclaimer, the term of this patent is extended or adjusted under 35 U.S.C. 154(b) by 1078 days.

(21) Appl. No.: 11/754,647

(22) Filed: May 29, 2007

(65) Prior Publication Data

US 2008/0297416 A1    Dec. 4, 2008

(51) Int. Cl.
*G06F 17/10*    (2006.01)
(52) U.S. Cl. ........................................................ 708/322
(58) Field of Classification Search .................... 708/322
See application file for complete search history.

(56) References Cited

U.S. PATENT DOCUMENTS

| | | | |
|---|---|---|---|
| 6,598,009 B2 * | 7/2003 | Yang | 702/152 |
| 6,825,808 B2 * | 11/2004 | Kimata et al. | 342/378 |
| 2002/0190999 A1 * | 12/2002 | Lee | 345/606 |
| 2004/0048593 A1 * | 3/2004 | Sano | 455/323 |

* cited by examiner

*Primary Examiner* — Tan V Mai
(74) *Attorney, Agent, or Firm* — Fogg & Powers LLC

(57) ABSTRACT

A system and method is provided for performing matrix inverse functions, for example, for use within Space-Time Adaptive Processing (STAP). The methods use parallelism of a Forward/Backward substitution algorithm in two dimensions to increase a speed of execution of the matrix inverse function. Sampled data is combined with steering vector values, which direct antennas in a desired direction in the absence interference, in order to determine adaptive weights used within filters to remove unwanted energy in the sampled data due to jammers, clutter or other interference. The adaptive weights are recursively computed, using stored values of previously calculated adaptive weights and other factor coefficients derived from the sampled data.

18 Claims, 9 Drawing Sheets

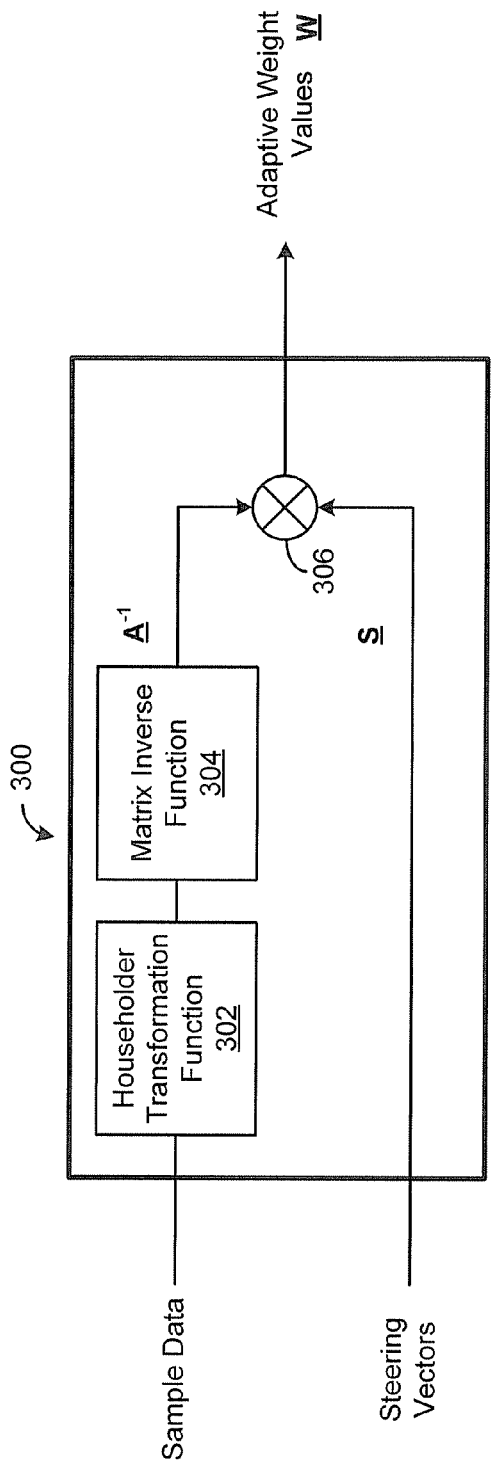

Factor Memory Contents after each pass through

| | | | | | | | | | | |
|---|---|---|---|---|---|---|---|---|---|---|
| 1 | 1 | 1 | 1 | 1 | | $p$ | $m$ | $j$ | $f$ | $a$ |
| 0 | 0 | 0 | 0 | 0 | | 0 | 0 | 0 | 0 | 0 |
| 0 | 0 | 0 | 0 | 0 | | 0 | 0 | 0 | 0 | 0 |
| 0 | 0 | 0 | 0 | 0 | | 0 | 0 | 0 | 0 | 0 |
| 0 | 0 | 0 | 0 | 0 | | 0 | 0 | 0 | 0 | 0 |

A    B

| | | | | | | | | | | |
|---|---|---|---|---|---|---|---|---|---|---|
| $M_p^2$ | $M_m^2$ | $M_j^2$ | $M_f^2$ | $M_a^2$ | | $\frac{1}{M_p^2}$ | $\frac{1}{M_m^2}$ | $\frac{1}{M_j^2}$ | $\frac{1}{M_f^2}$ | $\frac{1}{M_a^2}$ |
| 0 | 0 | 0 | 0 | 0 | | 0 | 0 | 0 | 0 | 0 |
| 0 | 0 | 0 | 0 | 0 | | 0 | 0 | 0 | 0 | 0 |
| 0 | 0 | 0 | 0 | 0 | | 0 | 0 | 0 | 0 | 0 |
| 0 | 0 | 0 | 0 | 0 | | 0 | 0 | 0 | 0 | 0 |

C    D

| | | | | | | | | | | |
|---|---|---|---|---|---|---|---|---|---|---|
| $\alpha$ | $\beta$ | $\gamma$ | $\delta$ | $\varepsilon$ | | $\alpha$ | $\beta$ | $\gamma$ | $\delta$ | $\varepsilon$ |
| 0 | 0 | 0 | 0 | 0 | | 0 | 0 | 0 | 0 | 0 |
| 0 | 0 | 0 | 0 | 0 | | 0 | 0 | 0 | 0 | 0 |
| 0 | 0 | 0 | 0 | 0 | | 0 | 0 | 0 | 0 | 0 |
| 0 | 0 | 0 | 0 | 0 | | 0 | 0 | 0 | 0 | 0 |

E    F

| | | | | | | | | | | |
|---|---|---|---|---|---|---|---|---|---|---|
| $\alpha$ | $\beta$ | $\gamma$ | $\delta$ | $\varepsilon$ | | $\alpha$ | $\beta$ | $\gamma$ | $\delta$ | $\varepsilon$ |
| 0 | $q$ | $s$ | $v$ | $z$ | | 0 | $q$ | $s$ | $v$ | $z$ |
| 0 | 0 | $r$ | $u$ | $y$ | | 0 | 0 | $r$ | $u$ | $y$ |
| 0 | 0 | 0 | $t$ | $x$ | | 0 | 0 | 0 | $t$ | $x$ |
| 0 | 0 | 0 | 0 | $w$ | | 0 | 0 | 0 | 0 | 0 |

G    H

| | | | | |
|---|---|---|---|---|
| $\alpha$ | $\beta$ | $\gamma$ | $\delta$ | $\varepsilon$ |
| 0 | $q$ | $s$ | $v$ | $z$ |
| 0 | 0 | $r$ | $u$ | $y$ |
| 0 | 0 | 0 | $t$ | $x$ |
| 0 | 0 | 0 | 0 | $w$ |

I $$\alpha = \frac{p^*}{M_p^2} \quad \beta = \frac{m^*}{M_m^2} \quad \gamma = \frac{j^*}{M_j^2} \quad \delta = \frac{f^*}{M_f^2} \quad \varepsilon = \frac{a^*}{M_a^2}$$

($M_p^2 = |p|^2$, the magnitude of p squared, $= p \times p^*$, where $p^*$ is the complex conjugate of p)

FIGURE 6

METHOD AND SYSTEM FOR ACCELERATING THE COMPUTATION OF ADAPTIVE WEIGHTS USING MATRIX INVERSE CALCULATIONS

FIELD OF INVENTION

The present invention relates to calculating an inverse of a matrix to solve for adaptive weights to be applied to beam-forming antennas to remove unwanted received energy while maximizing the energy received from the desired direction.

BACKGROUND

Space-Time Adaptive Processing (STAP) presents a challenge to digital signal processors that are required to operate in real time. Available processing hardware, given limits on size, weight and power, and the need to achieve a substantial percentage of peak operating capacity to perform in real time involve careful attention to programming details. It has been found that within a STAP high speed pipeline, a maximum rate of running the pipeline was limited by the execution time of a matrix inverse function to compute a set of adaptive weights for the purpose of jammer nulling, i.e., the pipeline had to wait until the computation of the adaptive weights was completed before the pipeline could perform further processing on incoming data. In fact, the matrix inverse function can be a critical operation in many application domains, e.g., the computation of adaptive weights for jammer nulling and clutter cancellation in radar applications, deriving optimal solutions in control applications, etc.

Performing the matrix inverse calculation can be a very time consuming process. In real-time applications, the matrix inverse operation should be performed as rapidly as possible. One approach to performing a matrix inverse is to create an upper-right triangularized matrix via a Householder or equivalent transformation of received sample data and to perform a forward/backward (forback) substitution operation to solve for adaptive weights by computing a first weight, then computing a second weight (which requires the first weight value), and so forth. Forward or backward substitution is inherently a slow, sequential process.

It is desirable to speed up matrix inverse functions by exploiting parallelism in the forward/backward computations.

SUMMARY

Within embodiments disclosed below, a system and method is provided for accelerating the computation of matrix inverse functions, for example, for use within Space-Time Adaptive Processing (STAP). The method recursively computes adaptive weights for STAP data processing filters. The method includes receiving samples in the form of an upper-right triangularized matrix and computing an adapted weight vector (or matrix) that is derived from the upper-right triangularized matrix and an input steering weight vector (or matrix). An adapted weight vector is an (n×1) vector having weights $W_1$ to $W_n$. If there is more than one steering vector, i.e., a steering matrix, the collection of computed adapted weight vectors forms an adapted weight matrix. The method also includes using values of the steering vector (or matrix) and coefficients of the upper-right triangularized matrix to calculate weights $W_1$ to $W_n$ of each adapted weight vector in reverse order so that weight $W_n$ is calculated first, and storing calculated values for weights $W_1$ to $W_n$ of the adapted weight vector. Within the method, subsequently calculated weights of each adapted weight vector $W_n, \ldots, W_1$ are calculated using all previously stored calculated weights of the adapted weight vector.

In another embodiment, the method of recursively computing adaptive weights for data processing filters includes receiving samples from antenna elements in the form of an upper-right triangularized matrix, and receiving steering vector values ($S_1$ to $S_n$), which are used to direct the antenna elements in a desired direction. The method also includes establishing a set of equations ($E_1$ to $E_n$) to solve for adaptive weights ($W_1$ to $W_n$) to be applied to the antenna elements to remove unwanted received energy while maximizing the received energy from the desired pointing direction. Each equation includes a combination of a steering vector value, factor coefficients, and adaptive weight values. The method further includes computing the factor coefficients using reciprocals of entries in the upper-right triangularized matrix and entries in the upper-right triangularized matrix as multipliers, and then storing the factor coefficients in a first memory. Subsequently, the method includes solving the set of equations ($E_1$ to $E_n$) in reverse order ($E_n$ to $E_1$) using recursion, so that adaptive weight values within subsequently solved equations are determined from previously solved equations, wherein upon determining an adaptive weight value, the adaptive weight value is stored in a second memory, wherein the set of equations are solved by retrieving corresponding factor coefficients from the first memory and corresponding adaptive weight values from the second memory.

In another respect, a system for recursively computing adaptive weight coefficients for data processing filters is presented. The system includes a plurality of multiplexers for multiplexing entries of a vector (or matrix) holding sampled data from the antenna elements, entries of a steering vector for directing the antenna, and previously calculated adaptive weights used to filter outputs of the antenna. The system also includes a factor memory for storing calculated factor coefficients that are derived from the entries of the matrix holding sampled data and are used to calculate adaptive weights, and a weight matrix memory for storing the calculated adaptive weights. The system also includes a series of multiplier/accumulators (MACs) receiving outputs of the plurality of multiplexers, outputs of the factor memory and outputs of the weight matrix memory and calculating adaptive weights by combining the factor coefficients, the entries of the steering vector, and the previously calculated adaptive weights. The system further includes a controller for outputting control signals for the plurality of multiplexers and the factor memory.

These and other aspects will become apparent to those of ordinary skill in the art by reading the following detailed description, with reference where appropriate to the accompanying drawings. Further, it should be understood that the embodiments noted herein are not intended to limit the scope of the invention as claimed.

BRIEF DESCRIPTION OF FIGURES

FIG. 3 illustrates an example system for determining adaptive weight coefficients for STAP filtering.

FIG. 4 illustrates an example computation performed by the system shown in FIG. 3.

FIG. 6 illustrates example contents of memory within the system shown in FIG. 5 during processing of data.

DETAILED DESCRIPTION

Within embodiments described below, a system and method is provided for performing matrix inverse functions, for example, for use within Space-Time Adaptive Processing (STAP). Exemplary embodiments use parallelism of a Forward/Backward substitution algorithm in two dimensions to increase a speed of execution of the function. The Forward/Backward substitution algorithm presented herein uses diagonal parallelism simultaneously with horizontal parallelism to achieve higher performance and faster execution of matrix inverse functions.

Space-Time Adaptive Processing (STAP) presents a challenge to digital signal processors that are required to operate in real time. STAP is used for performing Airborne Moving Target Indicator (AMTI) and Ground Moving Target Indicator (GMTI) functions. STAP is an application of optimum and adaptive array processing algorithms for target detection within ground clutter and interference using pulse-Doppler waveforms and multi-channel antennas/receivers.

Optimum filter solutions used within STAP are designed based on known covariance sample matrices and known angle-Doppler steering vectors. An adaptive STAP filter uses estimated covariance matrices from a priori-selected range data and estimated steering vectors.

Figure 1:
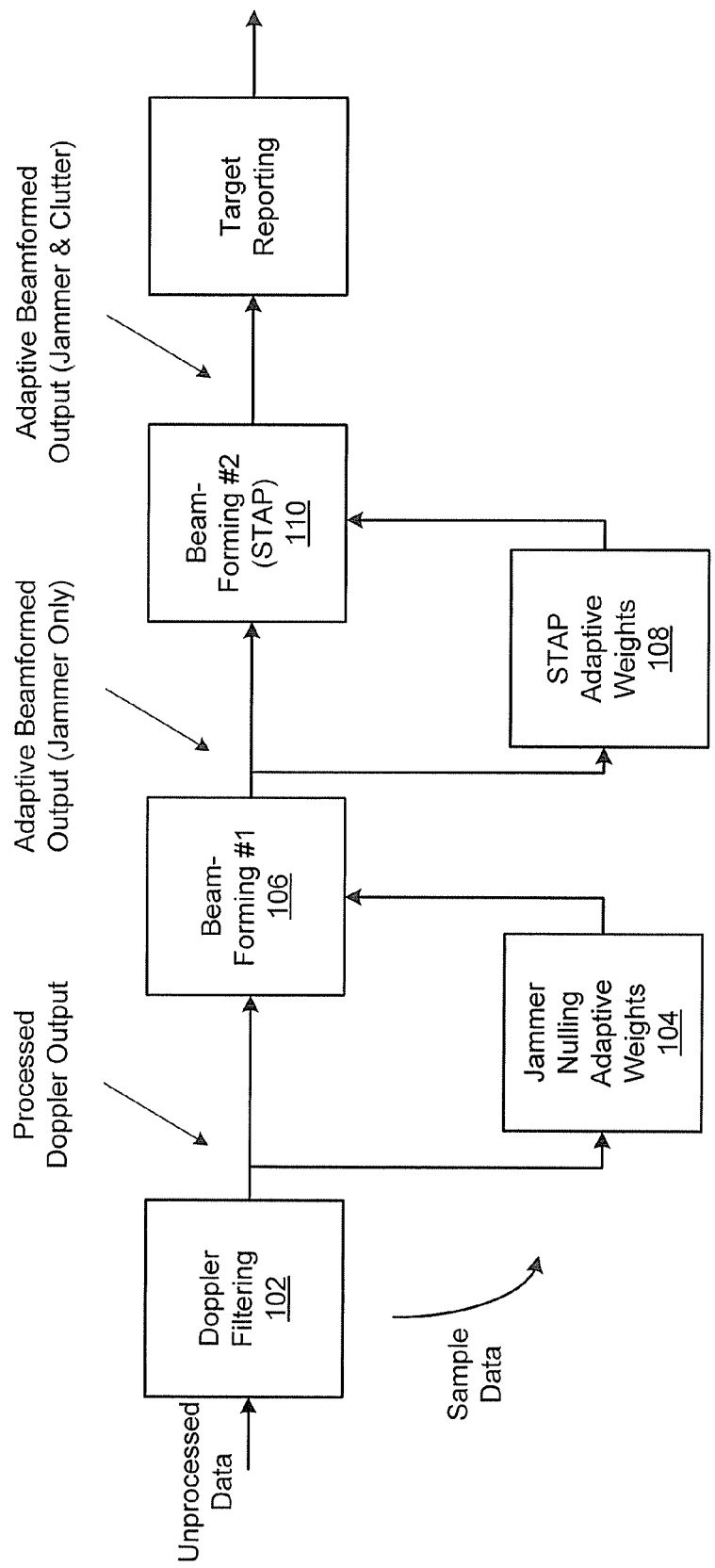
FIG. 1 is an example data flowchart illustrating processes used in Space-Time Adaptive Processing (STAP).

Referring to FIG. 1, an example data flowchart is illustrated for STAP. Initially, unprocessed sampled data is put through Doppler filtering 102. Next, Jammer Nulling weights 104 are computed to filter out any interference, and input to Beamforming #1 function 106. Following, STAP adaptive weights 108 are computed and input to Beamforming #2 function 110 to further filter the sampled data to remove Clutter.

Figure 2A:
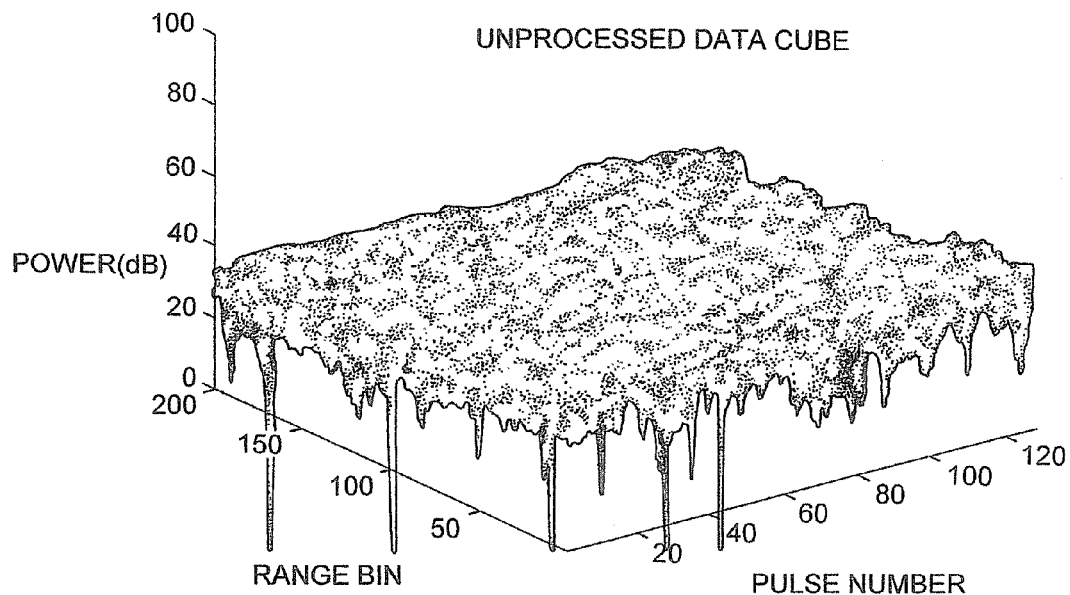
FIGS. 2A-2E illustrate example outputs of blocks within the data flowchart of FIG. 1.
Figure 2B:
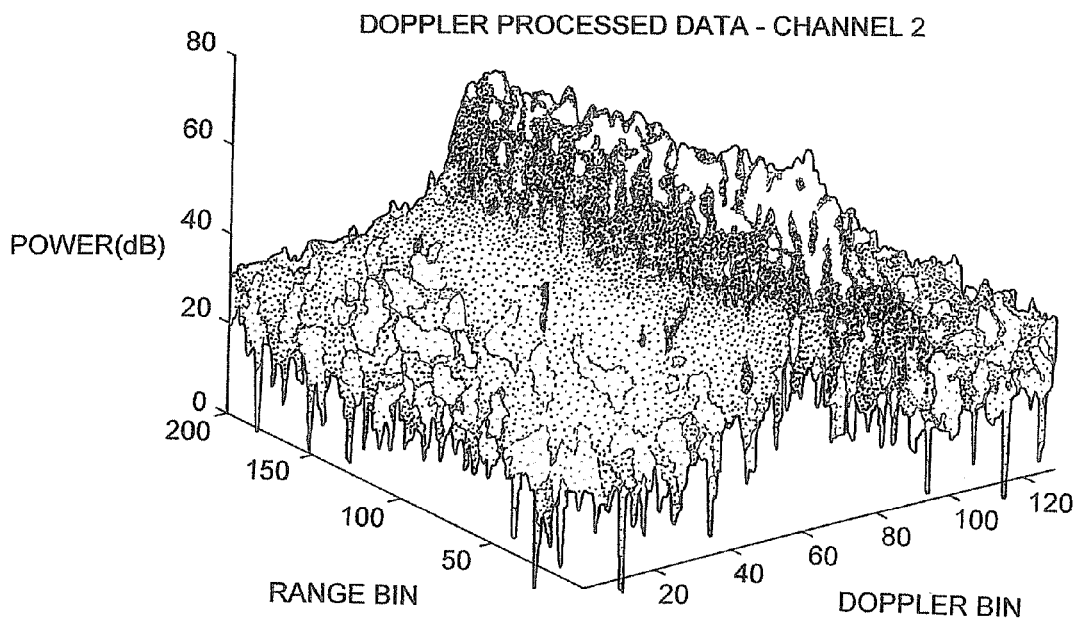
Figure 2C:
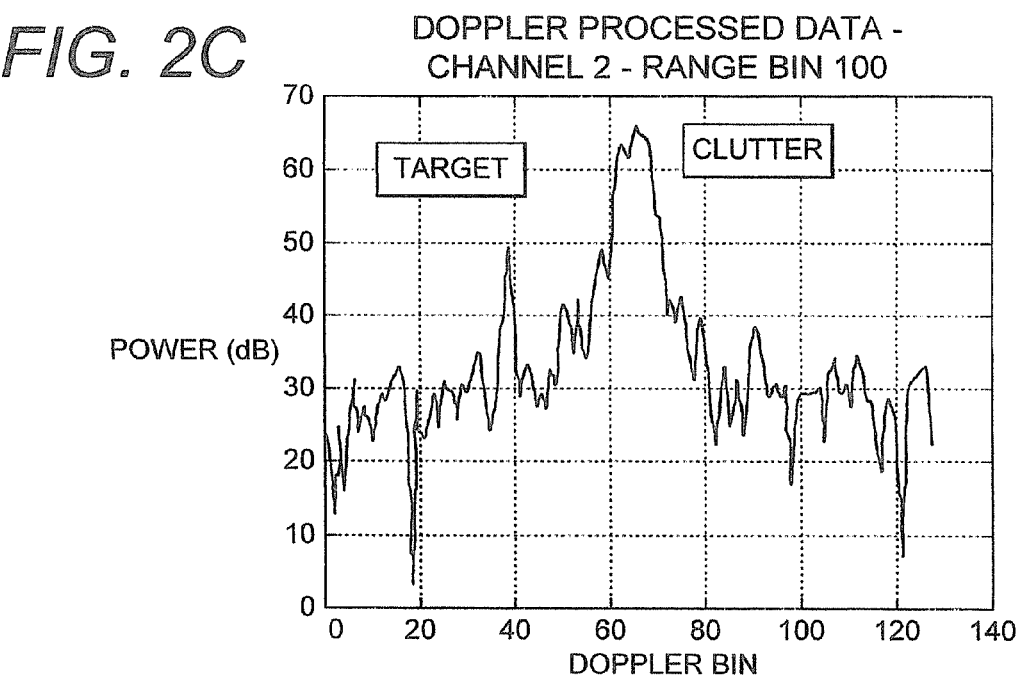
Figure 2D:
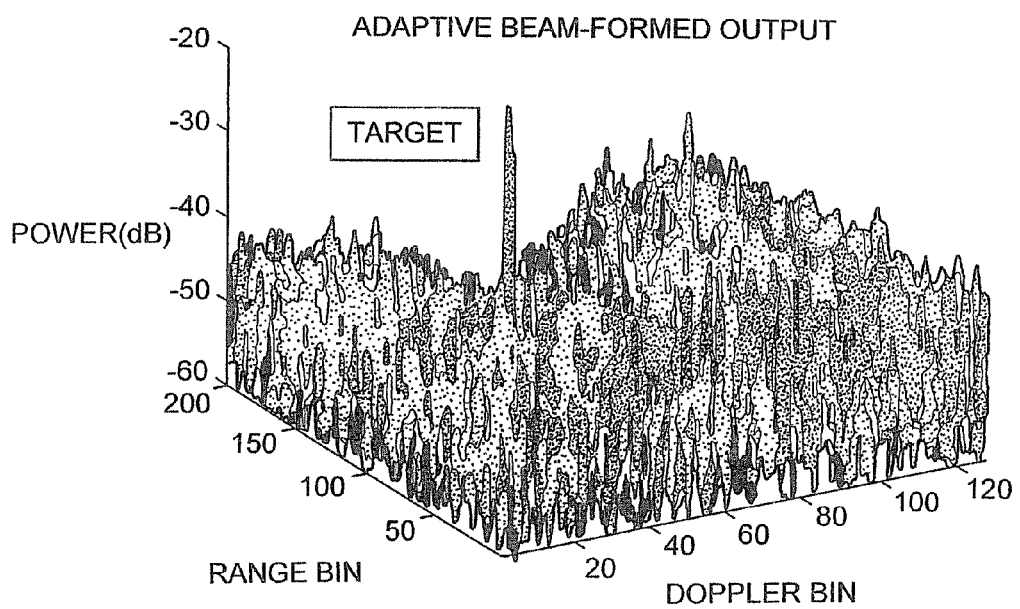
Figure 2E:
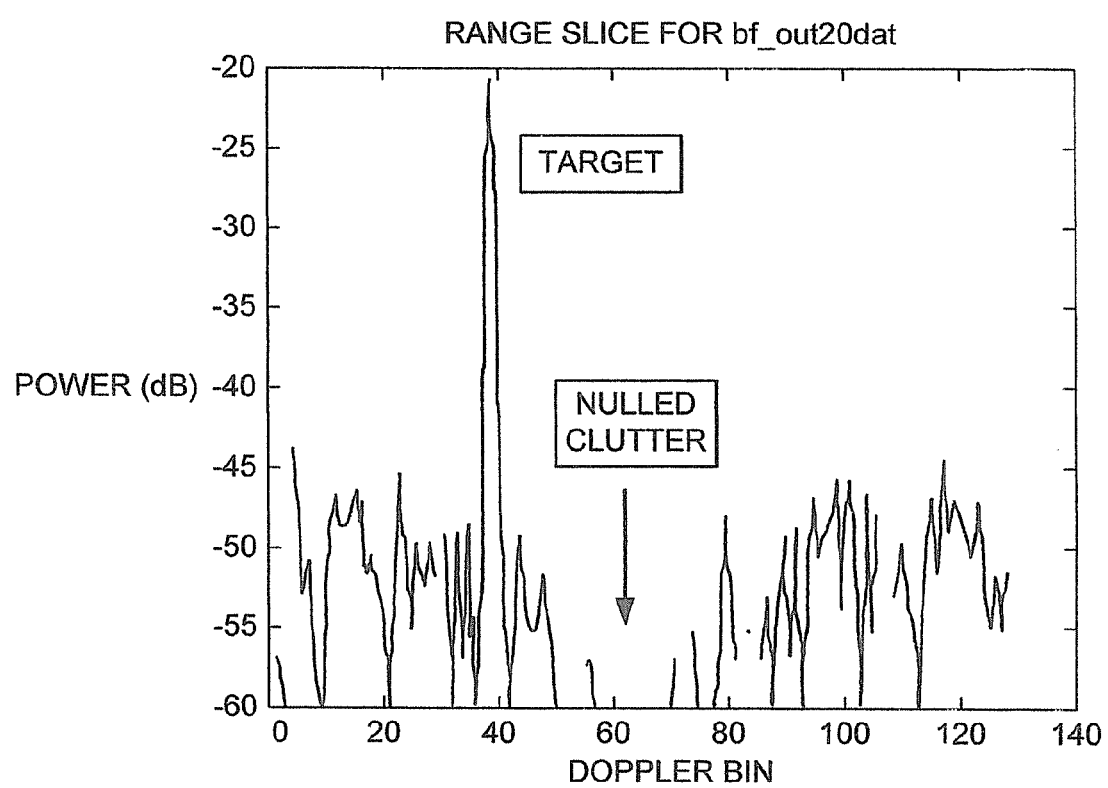

FIGS. 2A-2E illustrate example outputs of the blocks shown in FIG. 1. Initially, FIG. 2A shows an example 3-D graph of unprocessed input data. FIG. 2B shows an example 3-D graph of the input data after the Doppler filtering. FIG. 2C shows an example 2-D graph of the target data and other "clutter" data for a single range bin. FIG. 2D shows an example 3-D graph of the input data after adaptive beam-forming processing has occurred, and FIG. 2E shows an example 2-D graph of the beam-forming processed data for a single range bin. As shown in FIG. 2E, the target data is highly visible, while the clutter data has been filtered out, i.e., suppressed.

A maximum rate of running the adaptive filter processing pipeline shown in FIG. 1 has been limited by the execution time of the matrix inverse function to compute a set of adaptive weights for the purposes of both jammer nulling (interference cancellation) and clutter cancellation. Thus, the pipeline had to wait until the computation of the adaptive weights was completed before the pipeline could perform further processing on incoming data. For example, referring to FIG. 1, note that the Beamforming #1 function 106 cannot begin until the Jammer Nulling weights 104 have been computed, creating a bottleneck in the pipelined processing. Similarly, the Beamforming #2 function 110 cannot begin until the STAP adaptive weights 108 have been computed.

In one example, both Jammer Nulling weights and Clutter Suppression weights are computed using matrix inverse functions. The application of STAP is normally associated with sensing from a moving platform, e.g., a spacecraft, an aircraft, or a UAV (Unattended Airborne Vehicle). As the platform moves, the angle-of-arrival of signals from jammers, from clutter, and from the desired target areas are continuously changing with time. As a result, the adapted weights are re-computed continuously to maximize system performance. Re-computing the adapted weights in real time requires heavy processor usage. Each time new data is received, new adaptive weights are computed to filter the data. Thus, computation of the adaptive weights has become one of the major processing limitations within STAP. The computation of the adaptive weights is a processing bottleneck for a high performance processing pipelines because subsequent computations cannot be performed until the adaptive weight computation is complete.

In an example embodiment, to compute the adaptive weights, a Forward/Backward substitution algorithm is presented that uses diagonal parallelism simultaneously with horizontal parallelism to achieve higher performance and faster execution of matrix inverse functions. Initially, as shown in FIG. 1, the Doppler filtering 102 results in sample data received from an antenna system. The sample data is combined with steering vector values, which are the antenna element steering weights in the desired direction in the absence of interference, in order to determine adaptive weights used to remove unwanted energy from jammers, clutter or other interference.

FIG. 3 illustrates an example a system 300 for determining the adaptive weights. The system 300 may be implemented in hardware, software, or a combination, such as a general purpose or dedicated processor running a software application through volatile or non-volatile memory. The system 300 may be included within any antenna beam-forming apparatus or other STAP device, for example.

The system 300 uses recursive operations to determine the adaptive weights. Initially, the system receives sampled data in the form of a matrix, A. The system 300 then transforms the sample data A into an upper-right triangularized matrix, QR, via a Householder or equivalent transformation function 302. The upper-right triangularized matrix, QR, is then input into a matrix inverse function 304, which computes the inverse of the QR matrix.

Both the Householder transformation function 302 and the matrix inverse function 304 may be provided using machine language instructions or software with object-oriented instructions, such as the C++ programming language. However, other programming languages (such as the C programming language for instance) could be used as well. In that case, both the Householder transformation function 302 and the matrix inverse function 304 may be performed by a processing unit (not shown) in the system 300 that operates according to an operating system, which may be any suitable commercially available embedded or disk-based operating system, or any proprietary operating system. The processing unit may comprise one or more smaller central processing units, including, for example, a programmable digital signal processing engine. The processing unit may also be implemented as one or more application specific integrated circuits (ASICs), a one or more Field Programmable Gate Arrays (FPGAs), or one or more Field Programmable Object Arrays (FPOAs) to improve speed and to economize space.

The system 300 will also receive a Steering Vector, S, that has values ($S_1$ to $S_n$). The inverse of the upper-right triangularized matrix, QR, and the Steering Vector, S, are input into a multiplier 306 to compute the adaptive weights, W, by solving Equations (1)-(4), as shown below:

$$A*W=S \quad \text{Equation (1)}$$

$$A^{-1}*A*W=A^{-1}*S \quad \text{Equation (2)}$$

$$W=[A]^{-1}*S, \text{ where } A=QR, \quad \text{Equation (3)}$$

$$\text{So, } W=[QR]^{-1}*S \quad \text{Equation (4)}$$

Equation (1) is illustrated in FIG. 4. As shown, after the Householder transformation, the sample matrix A is in the form of an upper-right triangularized matrix that has entries (a, b, . . . , n, and p). In FIG. 4, the upper-right triangularized matrix QR is shown to be a (5×5) matrix, the adaptive weight W is shown to be a (5×1) matrix, and the steering vector is shown to be a (5×1) matrix. However, each of the sample data, adaptive weights and steering vector may be in the form of any size vector or matrix.

As shown in FIG. 4, Equation (1) above can be written using the following set of equations:

$$S_5=p*W_5 \quad \text{Equation (5)}$$

$$S_4=m*W_4+n*W_5 \quad \text{Equation (6)}$$

$$S_3=j*W_3+k*W_4+l*W_5 \quad \text{Equation (7)}$$

$$S_2=f*W_2+g*W_3+h*W_4+i*W_5 \quad \text{Equation (8)}$$

$$S_1=a*W_1+b*W_2+c*W_3+d*W_4+e*W_5 \quad \text{Equation (9)}$$

Solving Equations (5)-(9) for the adaptive weights, W, results in the following set of equations:

$$W_5=(1/p)*S_5 \quad \text{Equation (10)}$$

$$W_4=(1/m)*S_4-(n/m)*W_5 \quad \text{Equation (11)}$$

$$W_3=(1/j)*S_3-(k/j)*W_4-(l/j)*W_5 \quad \text{Equation (12)}$$

$$W_2=(1/f)*S_2-(g/f)*W_3-(h/f)*W_4-(i/f)*W_5 \quad \text{Equation (13)}$$

$$W_1=(1/a)*S_1-(b/a)*W_2-(c/a)*W_3-(d/a)*W_4-(e/a)*W_5 \quad \text{Equation (14)}$$

Thus, to solve for the adaptive weights, W, the system 300 uses recursive operations to successively compute the adaptive weights. For example, weight $W_5$ needs to be computed first and used to compute weight $W_4$, weights $W_4$ and $W_5$ are used to compute weight $W_3$, weights $W_3$, $W_4$, and $W_5$ are used to compute weight $W_2$, and weights $W_2$, $W_3$, $W_4$, and $W_5$ are used to compute weight $W_1$. Thus, the entries of the adaptive weight matrix are computed in reverse order.

By solving for the adaptive weights using Equations (10)-(14), the inverse of the Householder matrix, QR, is not actually determined. Recall that, W=[QR]$^{-1}$*S, however, using the system of equations above, it is not necessary to determine the full inverse of the matrix QR, but rather, only to use the entries of the matrix QR to determine the adaptive weights. The inverse of the matrix QR could be generated, however, the extra processing steps needed to do so are unnecessary. In the event that the actual inverse of the matrix QR would be needed, the adaptive weight coefficients could be used to populate the matrix [QR]$^{-1}$, for example.

Figure 5:
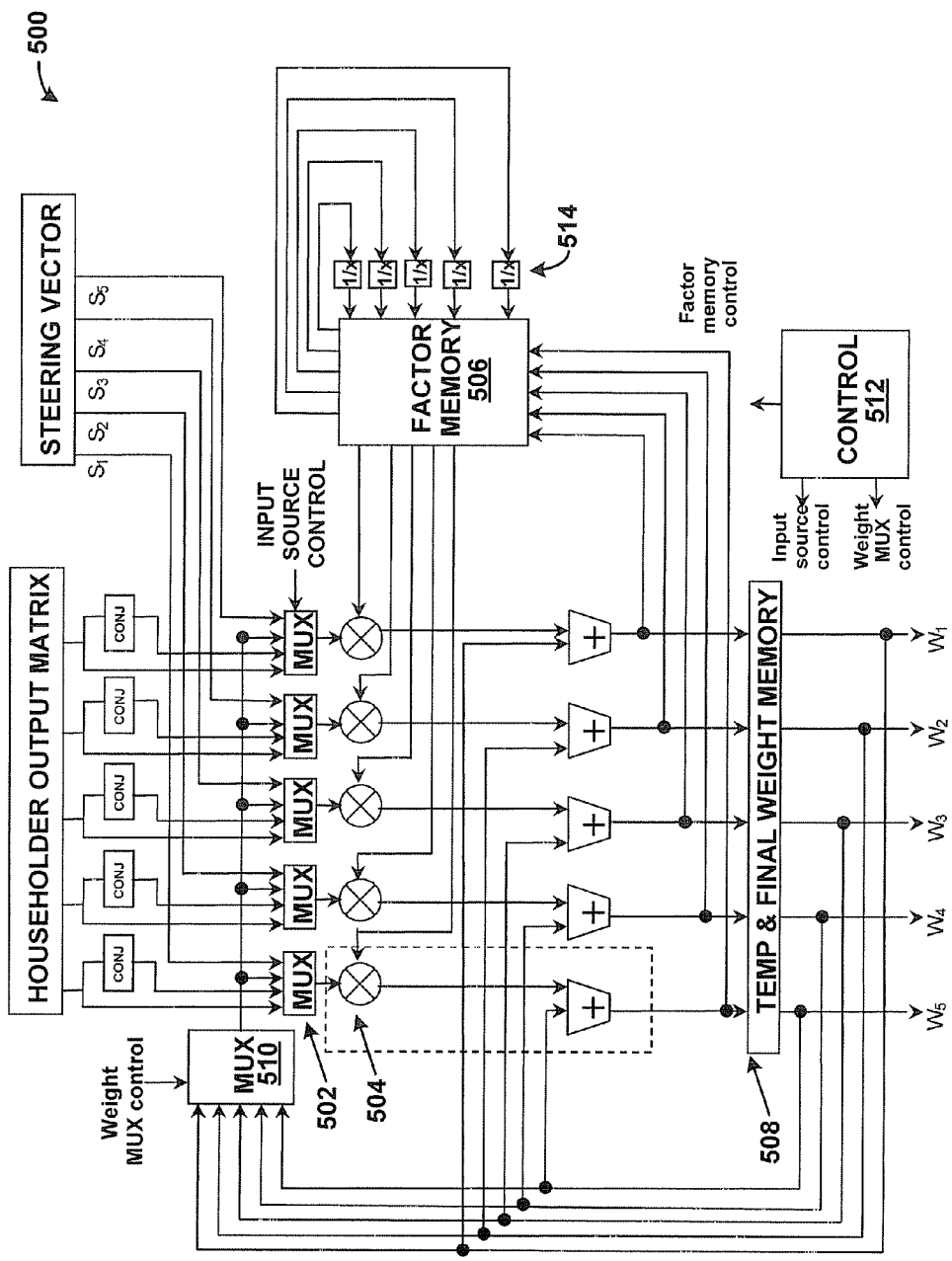
FIG. 5 is an example detailed illustration of a system for determining adaptive weight coefficients for STAP filtering.

FIG. 5 is an example detailed illustration of a system 500 for determining the adaptive weights. To determine the adaptive weights, Equations (10)-(14) above are solved. The equations are solved in two phases. The first phase recursively computes the factor coefficient computations, e.g., [(1/p), (1/m), (1/j), (1/f), (1/a), (n/m), (k/j), (g/f), (b/a), (l/j), (h/f), (c/a), (i/f), (d/a) and (e/a)]. The factor coefficients may be recursively computed so that coefficient (1/p) is computed first, stored, and then used to compute the coefficient (b/a). In this manner, coefficient (b/a) is computed using less processor clock cycles, since the (1/p) reciprocal is only computed once. Thus, the first phase computes and stores the factor coefficients that will be used in the second phase.

The second phase recursively computes the adaptive weights, generating a desired solution to the matrix inverse problem, i.e., the adapted weights ($W_1$ to $W_n$) which, when applied to incoming signals, minimize energy received from unwanted sources, as shown in FIGS. 2A-2E.

Referring to FIG. 5, the system 500 includes a series of multiplexers (MUX) 502, a series of multiplier/accumulators (MACs) 504, a factor memory 506, a temporary and final weight memory 508, a weight multiplexer 510, and a controller 512 that outputs the necessary control signals for input source control to multiplexers 502, multiplexer weight control for the weight multiplexer 510, and factor memory control for the factor memory 506, all connected as shown in FIG. 5.

Initially, as shown in FIG. 5, during the first phase entries of the Householder matrix are passed through the system to compute the factor coefficients in Equations (10)-(14). The factor coefficients are computed by passing the entries of the Householder matrix to the series of multiplexers 502 (after being passed through a conjugator function that reverses the sign of any imaginary component in a complex number, if present), and through the series of MACs 504 to the factor memory 506 which outputs certain coefficients through invertors 514, and subsequently stores the computed factor coefficients.

The entries of the Householder matrix are input to the system 500 in an order selected such that all factor coefficients are generated using a minimal number of processor clock cycles. Table 1 below shows an example of an order for which the entries of the matrix may be passed through the system 500, and corresponding factor memory 506 contents after each pass through. The factor memory contents column corresponds to the example factor memory contents shown in FIG. 6. The factor memory 506 may be initialized to [1 1 1 1 1], such that for the first pass through, the diagonal entries of the [QR] matrix are sent through the MACs 504 so that the factor memory 506 will contain the entries [p m j f a] after the second clock cycle.

TABLE 1

|  | Input | Factor Memory Output | Factor Memory Contents | Comment |
|---|---|---|---|---|
| Pass 1 | p m j f a | 1 1 1 1 1 | A | Pass through using multiply function |
| Pass 2 | p* m* j* f* a* | p m j f a | B | Conjugate multiply to produce mag squared |
| Pass 3 | p* m* j* f* a* | $M_p^2\ M_m^2\ M_j^2\ M_f^2\ M_a^2$ | C | Take reciprocal of |

TABLE 1-continued

| | Input | Factor Memory Output | Factor Memory Contents | Comment |
|---|---|---|---|---|
| Pass 4 | p* m* j* f* a* | $1/M_p^2\ 1/M_m^2\ 1/M_j^2\ 1/M_f^2\ 1/M_a^2$ | D | magnitudes squared Computes the $\alpha, \beta, \gamma, \delta, \epsilon$ normalizing factors, i.e., $\alpha = p^*/M_p^2$, $\beta = m^*/M_m^2, \gamma = j^*/M_j^2$, $\delta = f^*/M_f^2\ \epsilon = a^*/M_a^2$ |
| Pass 5 | 0 n l i e | $\alpha\ \beta\ \gamma\ \delta\ \epsilon$ | E | Computes $1^{st}$ set of factor coefficients |
| Pass 6 | 0 0 k h d | $\alpha\ \beta\ \gamma\ \delta\ \epsilon$ | F | Computes $2^{nd}$ set of factor coefficients |
| Pass 7 | 0 0 0 g c | $\alpha\ \beta\ \gamma\ \delta\ \epsilon$ | G | Computes $3^{rd}$ set of factor coefficients |
| Pass 8 | 0 0 0 0 b | $\alpha\ \beta\ \gamma\ \delta\ \epsilon$ | H | Computes 4th set of factor coefficients |

Next, the conjugates of the entries [p m j f a] are passed through the system 500, and multiplied by the entries to produce the magnitude squared of the entries in order to remove any imaginary components of the entries, if present. Following, the reciprocal of the magnitudes is computed so that now the factor memory 506 will contain the factor coefficients $[1/M_p^2, 1/M_m^2, 1/M_j^2, 1/M_f^2, 1/M_a^2]$, which are the first factor coefficients in each of Equations (10)-(14). Next, the remaining coefficients are computed by passing the remaining entries of the Householder matrix through the system 500. For example, the next pass through includes the entries [n l i e], which are multiplied with the stored values of $[1/M_m^2, 1/M_j^2, 1/M_f^2, 1/M_a^2]$ to produce the factor coefficients [n/m l/j i/f e/a], which are the last coefficients in each of Equations (10)-(14). At this point, all coefficients for Equations (10)-(11) have been generated, so that weights $W_5$ and $W_4$ now can be computed. Following, the entries [k h d], [g c], and [b] are passed through the system 500 to compute the remaining factor coefficients in an order such that after each pass through, the next adaptive weight could be computed, e.g., after passing [k h d], $W_3$ can be computed and after passing [g c], $W_2$ can be computed and after passing [b], $W_1$ can be computed. In this manner, looking at Equations (10)-(14), the entries of the matrix would be passed through the system 500 first in a horizontal fashion such that entries in the equations having the same horizontal position are passed through at the same time, e.g., entries [p m j f a], and then entries are passed through based on diagonal positioning.

The entries within the matrix could be passed through the system 500 in other orders as well. For instance, after passing through the initial entries [p m j f a], next the entries [n k g b] could be passed through, so that after the second pass, all of the factor coefficients within Equation (11) will be computed so that $W_4$ can be calculated. In that manner, looking at Equations (10)-(14), the entries of the matrix would be passed through the system 500 in a horizontal fashion such that entries in the equations having the same horizontal position are passed through at the same time.

In any event, if the two phases are done separately, e.g., factor coefficient computation and then adaptive weight computation, then the entries may be passed through the system 500 in any order. However, if the adaptive weights are going to be computed as soon as possible, based on the minimum number of clock cycles required, then it is desirable to calculate the factor coefficients such that the adaptive weights can be calculated in order.

After calculating all of the factor coefficients, they are stored in the factor memory 506. At stage "I", as shown in FIG. 6, the factor memory 506 is ready to proceed to the weight computation phase.

To compute the adaptive weights, the steering vectors are combined with the factor coefficients at the series of multiplexers 502 to form Equations (10)-(14). Initially, weight $W_5$ is computed, and then weight $W_5$ is output from the weight multiplexer 510 and combined with the corresponding factor coefficients to form Equation (11). This process continues to form each subsequent equation so that the adaptive weights are computed in reverse order.

After computing an adaptive weight value, it is stored in the temporary and final weight matrix memory 508. Table 2 below illustrates example contents of the temporary and final weight matrix memory 508 after each pass. For example, after the first pass through of the steering vectors, $W_5$ is computed and then stored in the memory 508. Additionally, after the first pass through, temporary values $T_4$, $T_3$, $T_2$, and $T_1$ are computed and stored in the memory 508. Each are an element within Equations (11)-(14). Then, after the second pass through, weight $W_5$ and $T_4$ are retrieved from memory 508, and the corresponding factor coefficient is retrieved from memory 506, so that Equation (11) can be solved, and weight $W_4$ is computed and stored in memory 508. This process is continued until all weight values $W_5$, $W_4$, $W_3$, $W_2$ and $W_1$ are computed and stored in memory 508.

TABLE 2

| Initial | 0 | 0 | 0 | 0 | 0 |
|---|---|---|---|---|---|
| Pass 1 | $[1/p]^*S_5 = W_5$ | $[1/m]^*S_4 = T_4$ | $[1/j]^*S_3 = T_3$ | $[1/f]^*S_2 = T_2$ | $[1/a]^*S_1 = T_1$ |
| Pass 2 | $W_5$ | $T_4 - [n/m]^*W_5 = W_4$ | $T_3 - [1/j]^*W_5 = T_3$ | $T_2 - [i/f]^*W_5 = T_2$ | $T_1 - [e/a]^*W_5 = T_1$ |
| Pass 3 | $W_5$ | $W_4$ | $T_3 - [k/j]^*W_4 = W_3$ | $T_2 - [h/f]^*W_4 = T_2$ | $T_1 - [d/a]^*W_4 = T_1$ |
| Pass 4 | $W_5$ | $W_4$ | $W_3$ | $T_2 - [g/f]^*W_3 = W_2$ | $T_1 - [c/a]^*W_3 = T_1$ |
| Pass 5 | $W_5$ | $W_4$ | $W_3$ | $W_2$ | $T_1 - [b/a]^*W_2 = W_1$ |

Figure 7:
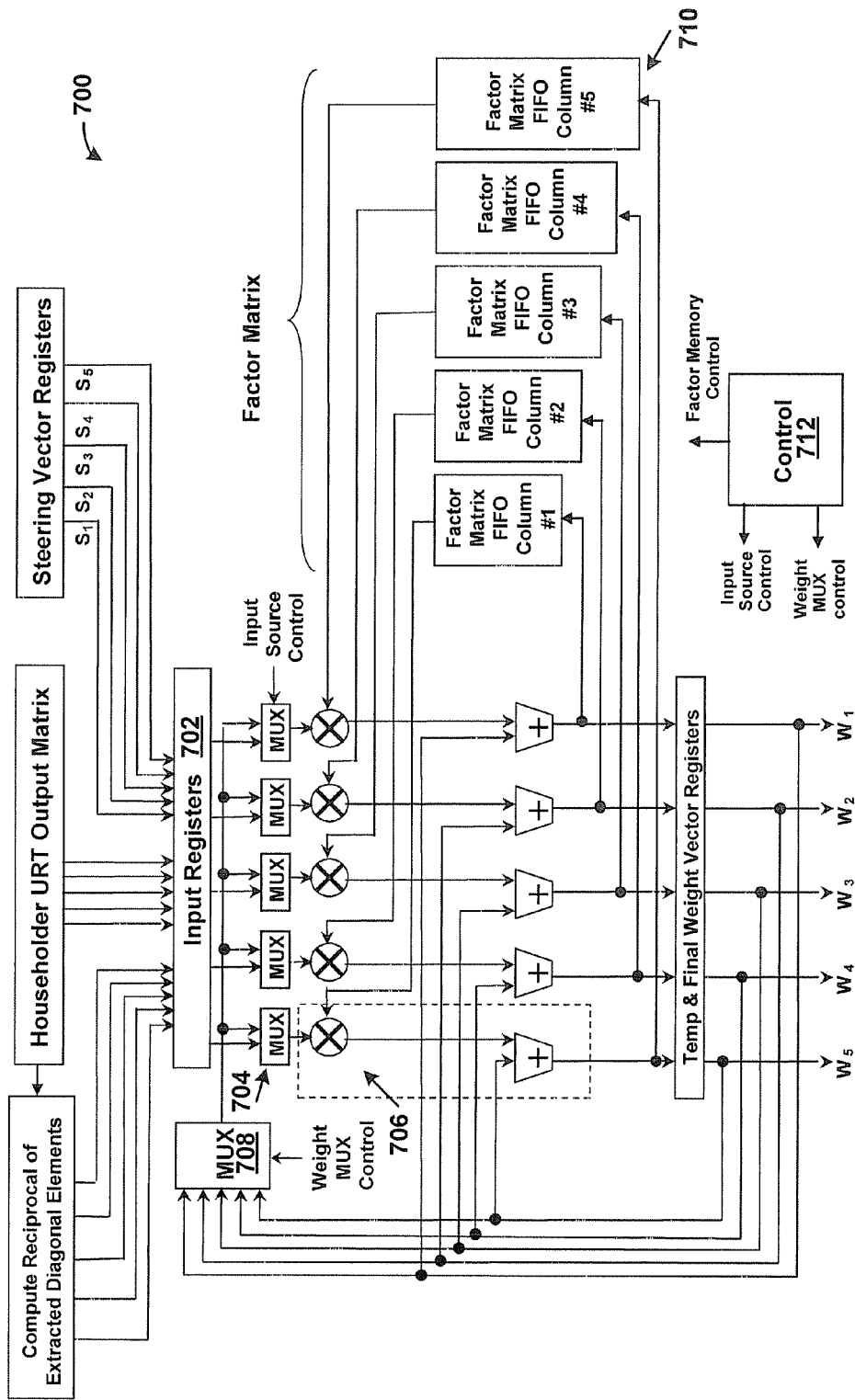
FIG. 7 is a more detailed illustration of a system for determining the adaptive weight coefficients for STAP filtering.

FIG. 7 is a more detailed illustration of a system 700 for determining the adaptive weights. The system 700 is implemented using, registers 702, multiplexers 704, basic multiplier/accumulator arithmetic functions 706, a weight coefficient multiplexer 708, FIFO (First In-First Out) buffers 710, and a control processor 712 outputting control signals to corresponding multiplexers. The system 700 extracts the diagonal elements from the upper right triangularized output matrix QR and pre-computes the inverses or reciprocals of the diagonal elements. The reciprocals of the diagonal elements, the remaining elements of the QR matrix, and the input steering vector elements are loaded into the input registers and are multiplexed into a solution at an appropriate time under the control of the control processor 712. In this particular implementation, the Factor Matrix is a series FIFO buffers associated with each column of the solution. The factor matrix elements are introduced into the solution at the appropriate time under control of the control processor 712. The system 700 may be implemented using an application specific integrated circuit (ASIC) or a field programmable gate array (FPGA) logic, for example, such as FPOA (Field Programmable Object Array) technology or AccelChip's (now part of XILINX) MATLAB-to-Silicon technology. The system 700 inputs entries from a real matrix, but the system may include complex multipliers and adders to perform complex computations using imaginary entries as well.

Figure 8:
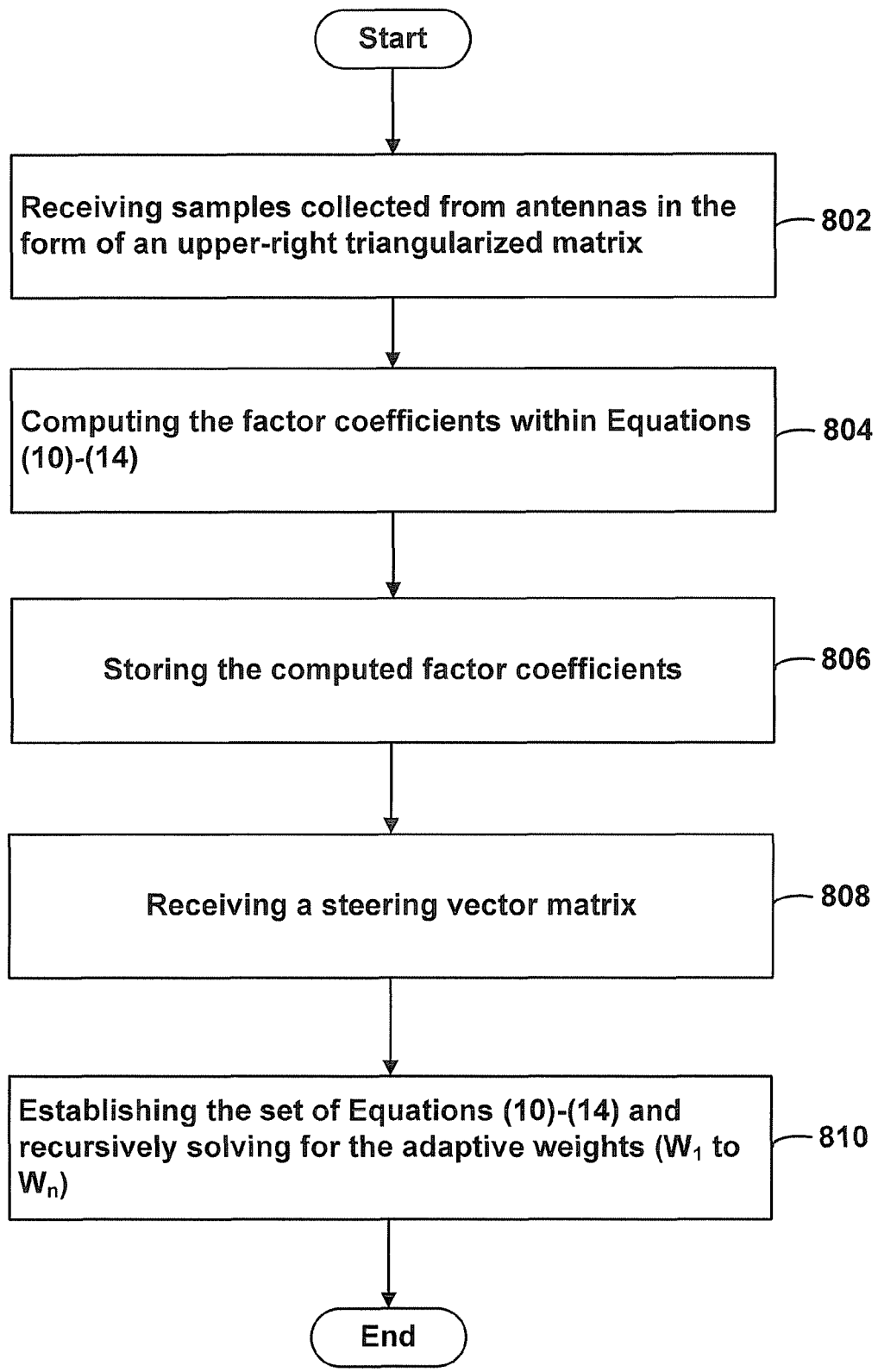
FIG. 8 is an example flowchart illustrating steps to recursively compute adaptive weight coefficients for STAP data processing filters from a set of input samples obtained from antenna elements.

FIG. 8 is an example flowchart illustrating steps to recursively compute the adaptive weight coefficients for STAP data processing filters. Initially, samples collected from antenna elements are received in the form of an upper-right triangularized matrix, as shown at block 802. Next, the factor coefficients within Equations (10)-(14) are computed, as shown at block 804. The factor coefficients are computed using the entries in the upper-right triangularized matrix. The computed factor coefficients are subsequently stored, as shown at block 806.

Next, a steering vector matrix is received, as shown at block 808. The steering vector can be designed to direct the antennas in a desired direction, possibly one in which less or no interference is present. Following, the set of Equations (10)-(14) are established and recursively solved for the adaptive weights ($W_1$ to $W_n$) to be applied to the antenna elements to remove unwanted received energy, as shown at block 810.

It is intended that the foregoing detailed description be regarded as illustrative rather than limiting, and it is intended to be understood that the following claims including all equivalents define the scope of the invention.

What is claimed is:

1. A computer readable storage medium having stored therein instructions for causing a processing unit to execute a method of recursively computing adaptive weights for data processing filters, the method comprising:
receiving samples in the form of an upper-right triangularized matrix;
receiving a steering vector,
using values of the steering vector and coefficients of the upper-right triangularized matrix to calculate in reverse order weights $W_1$ to $W_n$ for an adaptive weight vector so that weight $W_n$ is calculated first, wherein a single adaptive weight vector is an (n×1) vector having weights $W_1$ to $W_n$; and
storing, in a memory device, calculated values for weights $W_1$ to $W_n$ of the adaptive weight vector,
wherein each subsequently calculated weight of the adaptive weight vector $W_n, \ldots, W_1$ are calculated using all previously stored calculated weights of the adaptive weight vector.

2. The computer readable storage medium of claim 1, the method further comprising establishing a set of equations $E_1$ to $E_n$ to solve for the weights $W_1$ to $W_n$, wherein each equation includes a combination of the steering vector, reciprocals of coefficients of the upper-right triangularized matrix, and previously calculated values of the adaptive weight vector.

3. The computer readable storage medium of claim 2, the method further comprising:
calculating the reciprocals of coefficients of the upper-right triangularized matrix; and
storing the calculated values of the reciprocals of coefficients of the upper-right triangularized matrix.

4. The computer readable storage medium of claim 3, wherein calculating the reciprocals of coefficients of the upper-right triangularized matrix comprises calculating reciprocals of diagonal entries of the upper right triangularized matrix.

5. The computer readable storage medium of claim 3, wherein calculating the reciprocals of coefficients of the upper-right triangularized matrix comprises pre-computing the reciprocals prior to calculating the weights $W_1$ to $W_n$ of each adaptive weight vector.

6. The computer readable storage medium of claim 3, the method further comprising solving equations in the set of equations for the weights $W_1$ to $W_n$ of each adaptive weight vector by retrieving the stored calculated values of the reciprocals of coefficients of the upper-right triangularized matrix and previously calculated weights of each adaptive weight vector, wherein the equations in the set of equations for the weights $W_1$ to $W_n$ of each adaptive weight vector are solved in reverse order so that weight $W_n$ is calculated first by solving equation $E_n$.

7. The computer readable storage medium of claim 1, wherein calculating the weights $W_1$ to $W_n$ of each adaptive weight vector includes calculating coefficients for filtering information during Space-Time Adaptive Processing (STAP).

8. The computer readable storage medium of claim 1, wherein calculating the weights $W_1$ to $W_n$ for the adaptive weight vector is performed according to the following equation:

$$QR*W=S$$

where S is the steering vector, QR is the upper-right triangularized matrix, and W is the adaptive weight vector.

9. A computer readable storage medium having stored therein instructions for causing a processing unit to execute a method of recursively computing adaptive weight coefficients for data processing filters, the method comprising:
receiving samples from an antenna in the form of an upper-right triangularized matrix;
receiving steering vector values ($S_1$ to $S_n$), wherein the steering vector values ($S_1$ to $S_n$) are used to direct the antenna to point in a desired direction;
establishing a set of equations ($E_1$ to $E_n$) to solve for adaptive weights ($W_1$ to $W_n$) to be applied to the antenna to remove unwanted received energy, wherein each equation includes a combination of a steering vector value, factor coefficients, and adaptive weight values;
computing the factor using reciprocals of entries in the upper-right triangularized matrix, and using entries in the upper-right triangularized matrix as multipliers;
storing the factor coefficients in a first memory; and
solving the set of equations ($E_1$ to $E_n$) in reverse order ($E_n$ to $E_1$) using recursion, so that adaptive weight values within subsequently solved equations are determined from previously solved equations, wherein upon determining an adaptive weight value, the adaptive weight value is stored in a second memory, wherein the set of equations are solved by retrieving corresponding factor coefficients from the first memory and corresponding adaptive weight values from the second memory.

10. The computer readable storage medium of claim 9, wherein computing the factor coefficients using reciprocals of entries in the upper-right triangularized matrix comprises using reciprocals of diagonal entries of the upper-right triangularized matrix.

11. The computer readable storage medium of claim 9, wherein the equations $E_1$ to $E_n$ are solved by first recursively calculating the factor coefficients and then recursively computing the adaptive weights.

12. The computer readable storage medium of claim 9, wherein each equation in the set of equations ($E_1$ to $E_n$) includes one or more elements to be computed, and wherein solving the set of equations ($E_1$ to $E_n$) comprises:
  computing a first element in each equation ($E_1$ to $E_n$);
  storing the first element in each equation ($E_1$ to $E_n$) in the second memory; and
  receiving a solution to equation $E_n$.

13. The computer readable storage medium of claim 12, the method further comprising:
  computing subsequent elements in each equation ($E_1$ to $E_n$) in order; and
  storing the subsequent elements in each equation ($E_1$ to $E_n$) in the second memory.

14. The computer readable storage medium of claim 13, the method further comprising receiving solutions to equations ($E_{n-1}$ to $E_1$) by:
  retrieving the computed elements in the equations ($E_{n-1}$ to $E_1$); and
  combining corresponding computed elements for each equation ($E_{n-1}$ to $E_1$).

15. A system for recursively computing adaptive weight coefficients for data processing filters, the system comprising:
  a plurality of multiplexers for multiplexing entries of a matrix holding sampled data from an antenna element, entries of a steering vector for directing the antenna element, and previously calculated adaptive weight coefficients used to filter outputs of the antenna element;
  a factor memory for storing calculated factor coefficients, wherein the factor coefficients are derived from the entries of the matrix holding sampled data and are used to calculate adaptive weight coefficients;
  a weight matrix memory for storing the calculated adaptive weight coefficients;
  a plurality of multiplier/accumulators (MACs) receiving outputs of the plurality of multiplexers, outputs of the factor memory and outputs of the weight matrix memory and calculating adaptive weight coefficients by combining the factor coefficients, the entries of the steering vector, and the previously calculated adaptive weight coefficients; and
  a controller for outputting control signals for the plurality of multiplexers and the factor memory.

16. The system of claim 15, further comprising one or more input registers for receiving the entries of the matrix holding sampled data by antennas, the entries of the steering vector for directing the antennas, and the previously calculated adaptive weight coefficients used to filter outputs of the antennas.

17. The system of claim 15, wherein the factor memory comprises First In-First Out (FIFO) buffers for storing the calculated factor coefficients.

18. The system of claim 15, wherein the First In-First Out (FIFO) buffers output the calculated factor coefficients.

* * * * *